(12) United States Patent
Hestermann

(10) Patent No.: US 6,915,881 B2
(45) Date of Patent: Jul. 12, 2005

(54) LINEAR DRIVE

(75) Inventor: Jörg-Oliver Hestermann, Herzogenaurach (DE)

(73) Assignee: INA-Schaeffler KG (DE)

( * ) Notice: Subject to any disclaimer, the term of this patent is extended or adjusted under 35 U.S.C. 154(b) by 0 days.

(21) Appl. No.: 10/372,601

(22) Filed: Feb. 21, 2003

(65) Prior Publication Data

US 2003/0173162 A1 Sep. 18, 2003

(30) Foreign Application Priority Data

Feb. 22, 2002 (DE) .......................................... 102 07 697

(51) Int. Cl.[7] .......................... B61H 7/12; H02K 41/00; H02K 7/00
(52) U.S. Cl. .............................. 188/43; 310/12; 310/17
(58) Field of Search .............................. 188/38, 41, 43, 188/44, 58, 62, 67, 17; 104/281, 282, 283; 384/49; 310/12, 15, 17, 77; 318/135

(56) References Cited

U.S. PATENT DOCUMENTS

| | | | | |
|---|---|---|---|---|
| 2,959,695 A | * | 11/1960 | Huff .............................. | 310/77 |
| 4,831,290 A | | 5/1989 | Clauss et al. .................. | 310/12 |
| 4,953,988 A | | 9/1990 | Tsukada ........................ | 384/8 |
| 5,268,970 A | * | 12/1993 | Tanaka ......................... | 384/43 |
| 5,410,199 A | * | 4/1995 | Kinugasa et al. ............. | 310/12 |
| 5,785,155 A | | 7/1998 | Geka et al. .................... | 188/41 |
| 5,950,773 A | | 9/1999 | Ito ............................... | 188/67 |
| 6,179,468 B1 | * | 1/2001 | Thorstens et al. ............. | 384/40 |
| 6,227,336 B1 | * | 5/2001 | Rudy ........................... | 188/43 |

FOREIGN PATENT DOCUMENTS

| | | |
|---|---|---|
| DE | 8614673.4 | 11/1987 |
| DE | 4116795 | 11/1992 |
| DE | 20002915 | 9/2000 |
| DE | 20007499 | 11/2000 |
| WO | 99/42245 | 8/1999 |

OTHER PUBLICATIONS

Klaus Baalmann, "Konstruktive Aspekte bei der Gestaltung von Linearmotorantrieben", *Der Konstrukteur*, 7–8/99, pp. 76, 78.

Baalmann, K. "Konstruktive Aspekte bei der Gestaltung von Linearmotorantrieben", Der Konstrukteur, No. 7–8, pp. 76–78, 1999. Special: Linear Technology (with translation).

* cited by examiner

*Primary Examiner*—Xuan Lan Nguyen
(74) *Attorney, Agent, or Firm*—Ostrolenk, Faber, Gerb & Soffen, LLP

(57) ABSTRACT

A linear drive comprising a housing and a rail, which is mounted on the housing such that they can move relatively. Drive elements on the housing and on the rail to produce relative movement between the housing and the rail. The housing has a braking device to interact with a brake track provided on the rail. The brake track is in a groove in the rail. Anti-friction elements between the housing and the rail ride in the groove.

15 Claims, 2 Drawing Sheets

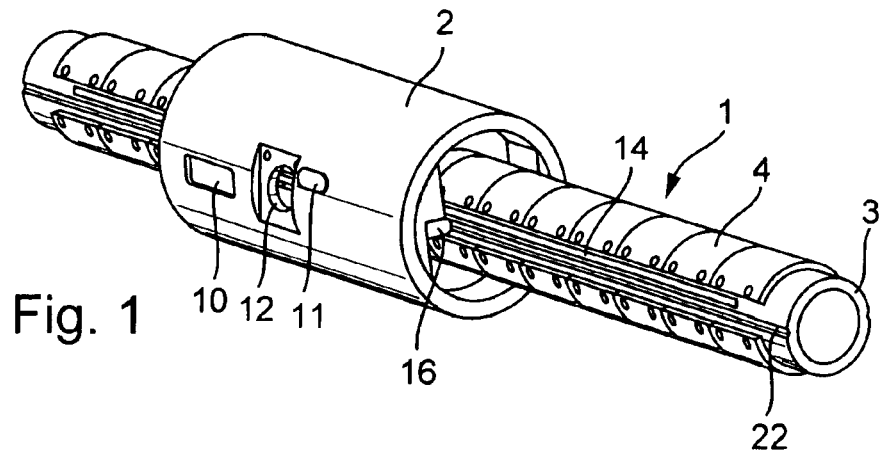
Fig. 1
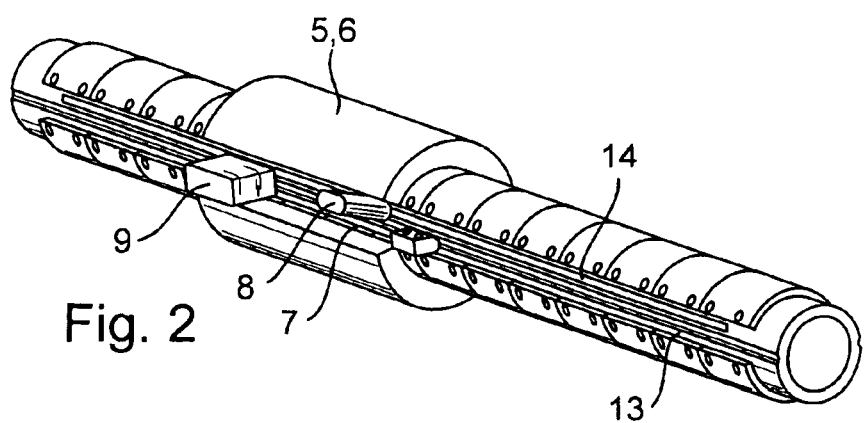
Fig. 2
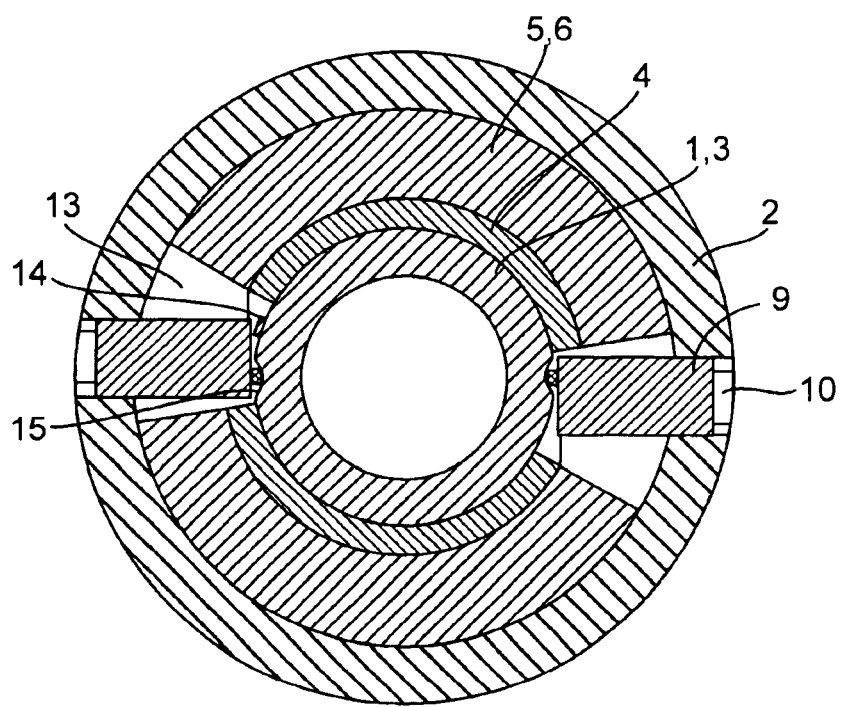

LINEAR DRIVE

BACKGROUND OF THE INVENTION

The present invention relates to linear drives, particularly linear drives like ones used in machine tools as a feed unit. For example, what are known as parallel kinematic machine tools are equipped with such feed units in their telescopic arms.

For example, WO 99/42245 A1 discloses a linear drive including a housing and a rail at which the housing is mounted for relative movement of the housing along the rail. In particular, this linear drive is provided with a carrier and a carrier housing, on which the carrier is mounted such that it can be moved longitudinally. Drive elements are provided on the carrier and on the carrier housing to produce relative movement between the carrier and the carrier housing. The carrier has a double T cross-sectional profile. The drive elements are primary and secondary parts in the form of coils or magnets to allow a direct electric drive. These linear drives are preferably used as feed axes in parallel structures. When used as a feed unit in machine tools, but also in other applications, high accelerations and retardations of the linear drive are desired in order to reach a desired actuating position quickly and reliably. The feed produced by the linear drive then has to be completed when a desired actuating position has been reached. In known linear drives, proper positioning, therefore also including braking, can be performed via the drive elements. In the event of power failure, positioning can no longer be carried out.

SUMMARY OF THE INVENTION

It is an object of the present invention to provide a linear drive including a housing and a rail at which the housing is mounted for relative movement of the housing along the rail, and in which fast and reliable stopping of the linear drive is ensured, particularly at a power failure or an emergency stop.

According to the invention, this object is achieved by providing the housing with an additional braking device to interact with a braking track provided on the rail. Relative movement between the rail and the housing can be reduced to a standstill quickly and reliably in the event of power failure by a braking device according to the invention. The braking device can form a structural unit together with the housing, enabling the device to be used without difficulty, for example in machine tools.

Braking devices may be mechanical braking devices in which, for example, a brake lining interacts with a brake track designed for mechanical friction. The brake can be prestressed, for example by means of spring force. In a situation which requires immediate stopping of the linear drive, the brake can be triggered, and the brake lining is pressed against the brake track under the spring force. Situations of this type can arise, for example, in a power failure or in a hazard situation. In the first case, the power failure can trigger the brake. In the second case, the brake can be actuated via an emergency off switch, and the drive elements would also be switched off. However, other braking devices can be used.

The rail can be mounted on the housing in a known way via anti-friction bearings, with running tracks for anti-friction elements provided along the rail. In this case, the brake track is arranged parallel to the running track.

For a particularly space-saving design, it is recommended to arrange the brake track within the running track for the anti-friction elements. For example, the rail may be provided with a groove, and the brake track is formed on the groove wall. For example, if a mechanical brake is used, the brake lining can be pressed into the groove and against the groove wall.

If the rail has a tubular cross-sectional profile, for example, brake jaws may be arranged at two mutually opposite points on the rail, with appropriate brake tracks for both brake jaws being formed on the rail.

A groove may also be formed along the rail. Its side walls are formed as a spherical groove and the base of the groove is formed as a brake track. The spherical groove may serve as a running track for balls of a known recirculating ball unit, which is fixed to the housing and circulate endlessly. Such units, for example, include an endless loop path of bearing balls, with two runs of the balls extending along the rail. The spherical grooves are arranged on the side walls of the groove. As a result, the base of the same groove is formed as a brake track. This means that considerably more peripheral surface on the rail is available for the arrangement of drive elements, for example, secondary parts arranged one after another in the longitudinal direction of the rail, for example, permanent magnets as the secondary parts.

The linear drive of the invention preferably includes a length measuring device, which comprises a measuring head provided on the housing and an embodiment of a scale provided on the rail. The scale embodiment is preferably fixed to the rail only at one point, so that thermal expansions of the rail are not transmitted to the scale.

The braking device preferably includes a brake caliper which bears a brake piston provided with a brake lining. The braking device can be actuated, for example, via an electric actuating drive or else hydraulically or mechanically. The brake piston is moved out of the brake caliper and is pressed with its brake lining against the brake track to achieve a braking effect.

A particularly compact linear drive is formed as a structural unit in which the housing has the braking device, a measuring head belonging to a length measuring device, preferably in conjunction with an embodiment of a scale fitted to the rail, and anti-friction element recirculation units for mounting the rail on the housing. This linear drive, equipped in this way can be used without difficulty, for example as a feed unit in machine tools with parallel structures.

A particularly lightweight yet rigid linear drive embodiment comprises the housing being tubular and being provided on its inner circumference with one or more primary parts which, in particular, can be formed by one or more exciter windings to which an electric current can be applied. In principle, the primary parts can be arranged symmetrically, so that attractive forces are in equilibrium transversely with respect to the rail. However, asymmetrical arrangements are also conceivable.

A plurality of primary parts are then arranged circumferentially spaced from one another in the circumferential direction. It is possible for the measuring head, the braking device and the anti-friction element recirculating units to be accommodated in the space between the spaced primary parts.

To further contribute to a particularly lightweight yet rigid linear drive, the rail has a tubular cross-sectional profile. The secondary parts, formed particularly by permanent magnets, are fitted to the outer circumference of the rail. Standardized tubes as a semifinished product can be used for these rails. It is possible, for example, for the above mentioned running track for anti-friction elements to be ground in without difficulty.

The secondary parts can be arranged in the circumferential direction initially spaced from one another. The brake track for the braking device and the running tracks for the anti-friction elements are arranged in the space.

Other objects and features of the invention are explained below using two exemplary embodiments illustrated in five Figures.

BRIEF DESCRIPTION OF THE DRAWINGS

FIG. 1 shows a perspective illustration of a linear drive according to the invention, FIG. 2 shows the linear drive of FIG. 1, but without a housing, FIG. 3 shows a cross section through the linear drive of FIG. 1.

DETAILED DESCRIPTION OF THE PREFERRED EMBODIMENTS

Figure 4:
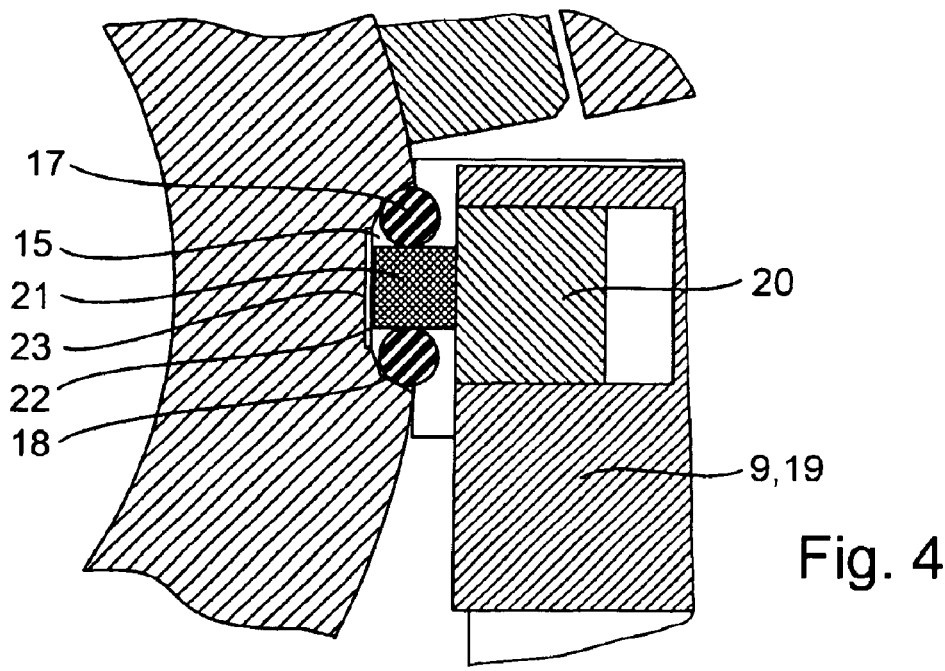
FIG. 4 shows an enlargement of a detail of the cross section depicted in FIG. 3

FIG. 1 is a perspective view of a linear drive according to the invention. A rail 1, tubular in cross section, is arranged such that it can be displaced longitudinally in a tubular housing 2. The rail 1 is formed by a tube 3. A plurality of permanent magnets 4 are arranged one after another along the tube 3. These form secondary parts.

FIG. 2 shows the linear drive without the housing 2. Two primary parts 5 are provided in the form of circular segments. They are formed by a plurality of coils 6 to which electric current can be applied. The primary parts 5 are arranged circumferentially spaced from one another. A measuring head 8 of a length measuring system and a braking device 9 are arranged in the space 7. The measuring head 8 and the braking device 9 are arranged in recesses 10, 11 in the housing 2, as seen in FIG. 1. FIG. 1 also shows a holder 12 between the recesses 10, 11 on the housing 2 for receiving a cardan bearing, not illustrated further, for cardanic suspension of the linear drive.

FIGS. 1 to 3 show two shell-like permanent magnets 4 arranged opposite each other around the circumference of the tube 3. There are spaces 13 between these permanent magnets arranged in pairs, as illustrated in FIG. 2. An embodiment of a scale 14 is provided in one of the interruption regions 13. It is arranged parallel to the longitudinal axis of the tube 3, and it is fixed to the tube 3 at only one point. This embodiment of a scale 14 interacts with the measuring head 8 to define a length measuring system, in order to be able to measure relative displacement between the rail 1 and the housing 2. An evaluation unit, a converter and related elements are not specifically explained here.

Furthermore, grooves are introduced into the two mutually opposite spaces 13 in the tube, parallel to the longitudinal axis of the tube 3, as in FIG. 3.

For the satisfactory mounting of the rail 1 on the housing 2, a plurality of bearing points are provided. They are formed here, for example, by recirculating ball units 16 as in FIG. 1 known per se. The recirculating ball units 16 are flange-mounted to the housing 2. At the two axial ends of the housing 2, two of these recirculating ball units 16 are in each case arranged at mutually opposite points on the circumference.

FIG. 4 shows that the balls 17 of the recirculating ball units 16 roll on spherical grooves 18, which are formed by the side walls of the groove 15. Two spherical grooves 18 arranged adjacent to each other form a pair of spherical grooves. In the embodiment shown, two pairs of spherical grooves are arranged diametrically opposite each other. In this way, between the two pairs of spherical grooves, the largest possible free circumferential area is created in the circumferential direction in order to fit secondary parts thereto. The two spherical grooves 18 of a pair of spherical grooves are arranged with mirror symmetry in relation to a plane which runs parallel to the rail 1, and the longitudinal axis of the tube 3 lying in this plane in the embodiment.

The linear drive according to the invention is provided with a braking device 9 illustrated in FIG. 4. It comprises a brake caliper 19, which is fixed in the recess 10 in the housing 2. In this brake caliper 19, a brake piston 20 is arranged such that it can be displaced. The brake piston 20 is provided with a brake lining 21 at its end which projects out of the brake caliper 19. The brake lining 21 engages between two rows of balls which are formed by the balls 17 of one or more recirculating ball units 16. The brake lining 21 interacts with a brake track 22, which extends parallel to the longitudinal axis of the rail 1, and the base 23 of the groove 15 forms the brake track 22. The brake piston 20 can be acted on electrically, pneumatically, hydraulically or mechanically. When the brake piston 20 is acted on, the brake lining 21 acts on the brake track 22 in order to stop relative movement between the rail 1 and the housing 2 quickly. The braking device 9 is actuated automatically when the power is switched off, that is to say when the linear drive is deenergized, or when an emergency off switch is operated.

Figure 5:
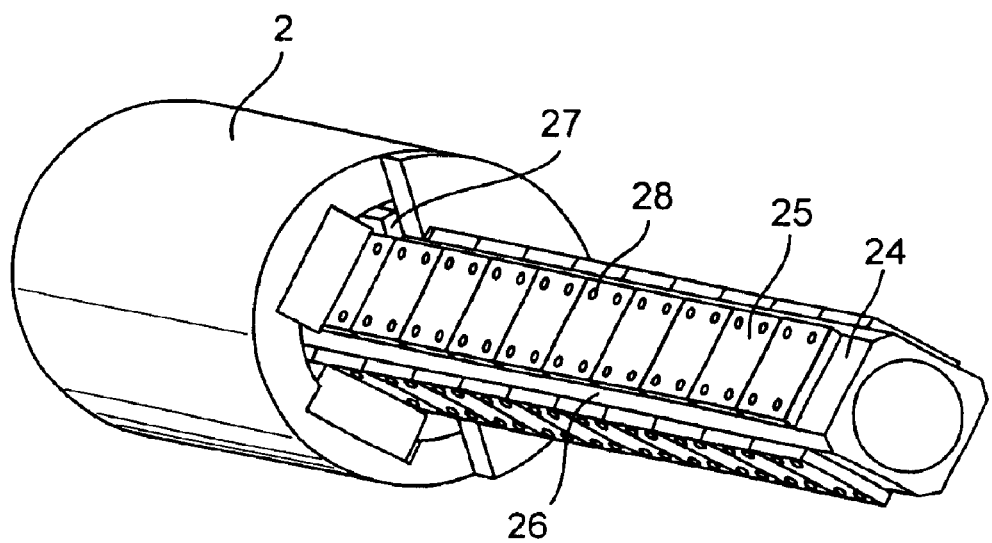
FIG. 5 shows a further linear drive according to the invention in a perspective illustration.

The linear drive according to the invention in the perspective illustration in FIG. 5 differs from the linear drive described above essentially in that, instead of a rail 1 with a tubular cross section, a rail 24 is formed with a square cross section. This rail 24 has four flat surfaces formed on the circumference, all extending parallel to the longitudinal axis of the rail 24. Commercially available flat permanent magnets 25 can advantageously be fitted to these surfaces. Instead of the permanent magnets, other secondary parts can also be used. In the corner regions of the rail 24, where two mutually adjacent surfaces of the rail 24, which are at right angles to each other, intersect, the rail 24 includes bevels 26. As in the exemplary embodiment described above, running tracks for anti-friction elements, brake tracks for the braking device and an embodiment of a scale for the length measuring device are provided on these bevels 26. FIG. 5 indicates a recirculating ball unit 27 which is fixed to the housing 2. The balls of the recirculating ball unit 27 which are not illustrated further, roll on a chamfer 26 formed as a spherical groove 28.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A linear drive comprising:
    a housing;
    a rail mounted for relative motion with respect to the housing, the rail being shaped to define a groove extending longitudinally along the rail, the rail including a recessed wall within the groove;
    anti-friction bearings including anti-friction elements for mounting the rail to the housing;

running tracks respectively arranged within the groove on opposite sides thereof and extending parallel to the groove longitudinally along the rail, the running tracks being shaped to receive the anti-friction elements of the anti-friction bearings;

a drive element arranged on the housing end the rail for producing relative axial motion of the rail with respect to the housing;

a brake track provided on the recessed wall of the rail within the groove and extending parallel to and between the running tracks longitudinally along the rail; and a brake provided on the housing, the brake having lining which is normally out of contact with the brake track and operable to move into contact with the brake track for braking the relative axial motion of the rail with respect to the housing.

2. The linear drive of claim 1, wherein the groove includes side walls each formed as a spherical groove in the rail.

3. The linear drive of claim 1, further comprising a length measuring device comprising a measuring head on the housing; and a scale provided on the rail which cooperates with the measuring head for measuring a length of rail motion of the rail with respect to the housing.

4. The linear drive of claim 3 wherein the housing, the brake, the anti-friction elements of the anti-friction bearings, and the length measuring device form an integral structural unit.

5. The linear drive of claim 4, wherein the anti-friction elements comprise respective anti-friction element recirculation units for mounting the rail on the housing.

6. A linear drive of claim 3, wherein the housing is tubular in shape and has an inner circumference on which the drive element is arranged.

7. The linear drive of claim 6, wherein the drive element includes at least one primary part having an exciter winding to which electric current may be applied for producing the relative axial motion of the rail with respect to the housing.

8. The linear drive of claim 7 wherein the at least one primary part includes a plurality of primary parts on the housing, and the primary parts are arranged so that there is a circumferential space between the primary parts at the housing in the circumferential direction; the measuring head, the braking device and the anti-friction elements being positioned in the housing as to be accommodated in the circumferential space between the primary parts.

9. The linear drive of claim 8, wherein the rail has a tubular cross-sectional profile, and the drive element includes a plurality of secondary parts for cooperating with the primary pails for causing relative motion between the rail and the housing the secondary parts being fitted to the outer circumference of the rail.

10. The linear drive of claim 9, wherein the secondary parts comprise permanent magnets.

11. The linear drive of claim 9, wherein the secondary parts are arranged on the rail with a secondary circumferential space between them; the brake track for the brake and the running tracks for the anti-friction elements being arranged in the secondary circumferential space of the second part.

12. The linear drive of claim 1 wherein:

the brake comprises a brake caliper and a brake piston supported on the brake caliper for movement toward the rail; and the brake piston carries the brake lining which cooperates with the brake piston for braking the rail.

13. The linear drive of claim 1, wherein the rail has a tubular cross-sectional profile, and the drive element includes a plurality of primary parts on the housing and secondary parts on the rail, the primary and secondary parts being adapted to cooperate for causing motion of the rail with respect to the housing; the rail having a tubular cross-sectional profile and the secondary parts being fitted to the outer circumference of the rail.

14. The linear drive of claim 13, wherein each of the primary parts comprises an exciter winding to which electric current may be applied and each of the secondary parts comprises a primary magnet fitted to the outer circumference of the rail.

15. The linear drive of claim 1, wherein the brake is actuated automatically to move the brake lining into contact with the brake track to stop relative movement between the rail and the housing when one of the linear drive is de-energized and an emergency off switch is operated.

* * * * *